A system and method for restoring a web site previously defined with user customizations by an intranet portal application. A backup agent receives a restore request for a backed up web site. Restored data is used by the intranet portal application in order to rebuild the web site according to a predetermined template. Use of the template results in a rebuilt database which does not match the database originally backed up. For one or more identifiers being added, one or more new globally unique identifiers (GUIDs) are generated by the application to replace the identifiers. The backup agent queries the application to receive new GUIDs for a selected level of the hierarchy of the web site. The backup agent updates a mapping of IDs with the new GUIDs. The backup agent uses the mapping to identify differences between the rebuilt database and the database represented by the backup copy of the database. Based on identified differences, database operations are used to modify the rebuilt database so that it conforms to the originally backed up database.

(12) United States Patent
Beatty et al.

(10) Patent No.: US 8,364,640 B1
(45) Date of Patent: Jan. 29, 2013

(54) SYSTEM AND METHOD FOR RESTORE OF BACKUP DATA

(75) Inventors: Louis Beatty, Ormond, FL (US); Deepak Saraf, Windermere, FL (US)

(73) Assignee: Symantec Corporation, Mountain View, CA (US)

(*) Notice: Subject to any disclaimer, the term of this patent is extended or adjusted under 35 U.S.C. 154(b) by 208 days.

(21) Appl. No.: 12/757,447

(22) Filed: Apr. 9, 2010

(51) Int. Cl.
*G06F 17/00* (2006.01)
(52) U.S. Cl. .................................. 707/640; 707/653
(58) Field of Classification Search .......... 707/640, 707/653
See application file for complete search history.

(56) References Cited

U.S. PATENT DOCUMENTS

| | | | |
|---|---|---|---|
| 5,276,860 A | 1/1994 | Fortier et al. | |
| 5,535,381 A | 7/1996 | Kopper | |
| 5,555,371 A | 9/1996 | Duyanovich et al. | |
| 5,559,991 A | 9/1996 | Kanfi | |
| 5,835,953 A | 11/1998 | Ohran | |
| 5,978,791 A * | 11/1999 | Farber et al. | 707/640 |
| 5,991,542 A | 11/1999 | Han et al. | |
| 6,029,168 A | 2/2000 | Frey | |
| 6,085,298 A | 7/2000 | Ohran | |
| 6,101,585 A | 8/2000 | Brown et al. | |
| 6,304,882 B1 * | 10/2001 | Strellis et al. | 1/1 |
| 6,360,330 B1 | 3/2002 | Mutalik et al. | |
| 6,366,987 B1 | 4/2002 | Tzelnic et al. | |
| 6,542,962 B2 | 4/2003 | Kodama et al. | |
| 6,640,278 B1 | 10/2003 | Nolan et al. | |
| 6,665,815 B1 | 12/2003 | Goldstein et al. | |
| 6,714,952 B2 | 3/2004 | Dunham et al. | |
| 6,829,688 B2 | 12/2004 | Grubbs et al. | |
| 6,847,983 B2 | 1/2005 | Somalwar et al. | |
| 6,865,655 B1 | 3/2005 | Andersen | |

(Continued)

FOREIGN PATENT DOCUMENTS

EP 838758 4/1998

OTHER PUBLICATIONS

"Windows DDK Glossary," http://msdn.microsoft.com/library/default.asp?url=/library/en-us/gloss/hh/gloss/glossary_628b1dfc-c8f0-4143-a4ef-0dddae24be4b.xml.asp, (3 pages).

(Continued)

*Primary Examiner* — Rehana Perveen
*Assistant Examiner* — Tiffany Thuy Bui
(74) *Attorney, Agent, or Firm* — Rory D. Rankin; Meyertons, Hood, Kivlin, Kowert & Goetzel, P.C.

(57) ABSTRACT

17 Claims, 6 Drawing Sheets

U.S. PATENT DOCUMENTS

| | | | |
|---|---|---|---|
| 6,880,051 | B2 | 4/2005 | Timpanaro-Perrotta |
| 6,910,112 | B2 | 6/2005 | Berkowitz et al. |
| 6,938,135 | B1 | 8/2005 | Kekre et al. |
| 6,976,039 | B2 | 12/2005 | Chefalas et al. |
| 7,149,858 | B1 | 12/2006 | Kiselev |
| 7,290,017 | B1 | 10/2007 | Wang et al. |
| 7,290,101 | B1 | 10/2007 | Kekre et al. |
| 7,389,314 | B2 * | 6/2008 | Kulkarni et al. ....... 707/999.201 |
| 7,549,032 | B1 | 6/2009 | Kekre et al. |
| 7,596,713 | B2 | 9/2009 | Mani-Meitav et al. |
| 7,617,414 | B2 | 11/2009 | Becker et al. |
| 7,620,630 | B2 * | 11/2009 | Lloyd et al. ............ 707/999.004 |
| 7,991,973 | B2 * | 8/2011 | Jacobson et al. ............. 707/649 |
| 8,001,117 | B2 * | 8/2011 | Yahia et al. .................. 707/728 |
| 8,065,278 | B2 * | 11/2011 | Beatty et al. .................. 707/674 |
| 8,131,680 | B2 * | 3/2012 | Prahlad et al. ................ 707/648 |
| 8,190,564 | B2 * | 5/2012 | Pang ............................. 707/610 |
| 8,255,364 | B2 * | 8/2012 | Burnett et al. ................ 707/640 |
| 2002/0143743 | A1 * | 10/2002 | Iyer et al. ........................ 707/1 |
| 2003/0163495 | A1 | 8/2003 | Lanzatella et al. |
| 2003/0177149 | A1 | 9/2003 | Coombs |
| 2004/0268068 | A1 | 12/2004 | Curran |
| 2005/0102297 | A1 * | 5/2005 | Lloyd et al. .................. 707/100 |
| 2006/0230116 | A1 | 10/2006 | Couper et al. |
| 2006/0259509 | A1 * | 11/2006 | Stolte et al. .................. 707/102 |
| 2007/0143307 | A1 * | 6/2007 | Bowers et al. ................. 707/10 |
| 2008/0162491 | A1 * | 7/2008 | Becker et al. ................. 707/10 |
| 2008/0276217 | A1 * | 11/2008 | Nagaoka ....................... 717/105 |
| 2011/0131178 | A1 * | 6/2011 | Kanellos ....................... 707/609 |

OTHER PUBLICATIONS

"Repliweb R-1 User Guide—Version 3.1," RepliWeb, Inc., 2002, (27 pages).

"FilesX Xchange RestoreTM for Microsoft Exchange Server," FilesX, Inc., Aug. 2003, (2 pages).

"Instructor Articles," VERITAS Education, pp. 1-7, Apr. 2003.

"EMC TimeFinder Family," EMC Corporation, 8 pages, Oct. 2004.

"EMC TimeFinder Local Replication," EMC Corporation, 2 pages, Oct. 2004.

"Storage Area Networking-High-Speed Data Sharing Among Multiple Computer Platforms", Tivoli Systems, Inc., Copyright 2000. ftp://ftp.software.ibm.com/software/tivoli/whitepapers/san_data sharing_wp.pdf, (2000), 4 pages.

"Storage Management—Best Practices", Copyright 2001, IBM Corp., ftp://ftp.software.ibm.com/software/tivoli/whitepapers/wp-storage-bp.pdf, (2001), 11 pages.

Amiri, Khalil S., "Scalable and manageable storage systems", Ph.D. Thesis, Dept. of Electrical and Computer Engineering, Carnegie Mellon University, Pittsburgh, PA, http://www.pdl.cmu.edu/PDL-FTP/NASD/amiri_thesis.pdf, (Dec. 2000), i-241 pgs.

Wylie, Jay J., et al., "Selecting the Right Data Distribution Scheme for a Survivable Storage System", Research Paper, School of Computer Science, Carnegie Mellon University, Pittsburgh, PA, http://www.pdl.cmu.edu/PDL-FTPp/Storage/CMU-CS-01-120.pdf, May 2001), pp. 1-21.

* cited by examiner

SYSTEM AND METHOD FOR RESTORE OF BACKUP DATA

BACKGROUND OF THE INVENTION

1. Field of the Invention

This invention relates to the field of computer processing and, more particularly, to restoring database backup copies.

2. Description of the Related Art

As computer memory storage and data bandwidth increase, so does the amount and complexity of data that business and industry manage each day. A large portion of the data that may be managed in an enterprise involves content managed for a company or workgroup by a dedicated server, such as an enterprise information portal, which provides employees and customers the ability to search and access corporate information. Such information may include electronic documents, announcements, task, discussion topic, etc., that may be organized as lists of items. The enterprise information portal may serve as the gateway to log into the corporate network and retrieve electronic documents. It is noted that enterprise information portals are typically secure and private (also known as intranet portals), but also may include external gateways for wider or even public access.

An enterprise information portal often includes a back-end database system, which may serve as a document management system. The back-end database system may store data in the form of records comprising links to electronic documents, metadata, and/or other content associated with the portal, such as web pages. The back-end database in an enterprise information portal may in some cases be a variant of a stand-alone database system, which has been configured for document and content management.

Web site development software may support different types of web sites through the use of a template architecture. Therefore, multiple site definitions and templates may be created by application developers and used in a deployment. The web site definitions may consist of multiple tables and records located in a file system of a front-end web server. These tables and records define the various aspects of a web site and sub sites. One or more users may provide further changes to a deployed site definition in the file system by adding, deleting, and modifying information stored in these tables and records. Such customizations may provide a preferred look and feel for one or more web pages of the web site.

The tables and records used to define web pages may include linked lists utilizing numerical identifier values. Software within the intranet portal may generate a GUID (globally unique identifier) to be used to reference records and lists of items and to be used within linked lists. Following a database backup, a user may choose to restore a web site. The intranet portal application may receive the restored data and build, rather than restore, the web site according to a predetermined definition or format provided by a template architecture. In addition, the building process may include generating new GUID values. Because data may be rebuilt according to a predetermined format, customizations included in the backed up data of the web site may be lost in the rebuilt web site. For example, added records and lists of items might lose connections within linked lists due to the fact that the additions are not described in a template used for rebuilding the data. Similarly, corresponding links may be broken when new GUID values are generated as part of the restoration. Additionally, the navigation structure between pages may be lost resulting in broken web links in the restored web pages. Consequently, the look, feel, and content of the restored web pages may not be the same as the web pages, which were backed up.

In view of the above, improved systems and methods for restoration of backed up database data are desired.

SUMMARY OF THE INVENTION

Systems and methods for restoring database data previously defined with user customizations are contemplated.

In one embodiment, a method includes receiving a request to restore a web site from an archived copy of a database file. The backed up copy of the web site includes customizations created by one or more users. During restoration of the data, an intranet portal application to which the data corresponds begins processing and rebuilding the data. In one embodiment, processing of the data by the application is based upon a template architecture. Based upon this template, the database is rebuilt. However, customization type data may not conform to the template(s) and may not be properly restored. In one embodiment, the portal application data is managed by a content management system, such as the Microsoft® SharePoint® content management system. In an embodiment in which the restored data corresponds to a website, the stored tables may include at least a Web Parts table and a Navigation Nodes table.

During the restore operation, one or more tables corresponding to the restored data may be created. In various embodiments, these tables may be cached in memory during the restore operation for faster access. In one embodiment, these tables may identify various objects and data structures in the restored data along with corresponding identifiers as they appeared at the time of backup. As restored data is made available to the intranet portal application, one or more identifiers included in the restored data are replaced by the application with newly generated identifiers. In one embodiment, these identifiers correspond to globally unique identifiers (GUIDs) used to identify data structures and link entries of one or more tables in order to define the web site. As the restore operation proceeds, these newly generated GUID values may be used to update the restored identifier values in the cached tables. When the cached tables are updated with the newly generated GUID values, the corresponding entries may be added to the intranet portal application using one of the one or more newly generated GUIDs in place of each corresponding restored GUID. Additionally, an analysis of the rebuilt database is performed to identify differences between it and the database represented by the backup copy of the database. Based on identified differences, the rebuilt database is modified so that it conforms to the database represented by the backup copy.

These and other embodiments will be appreciated upon reference to the following description and accompanying drawings.

Figure 1:
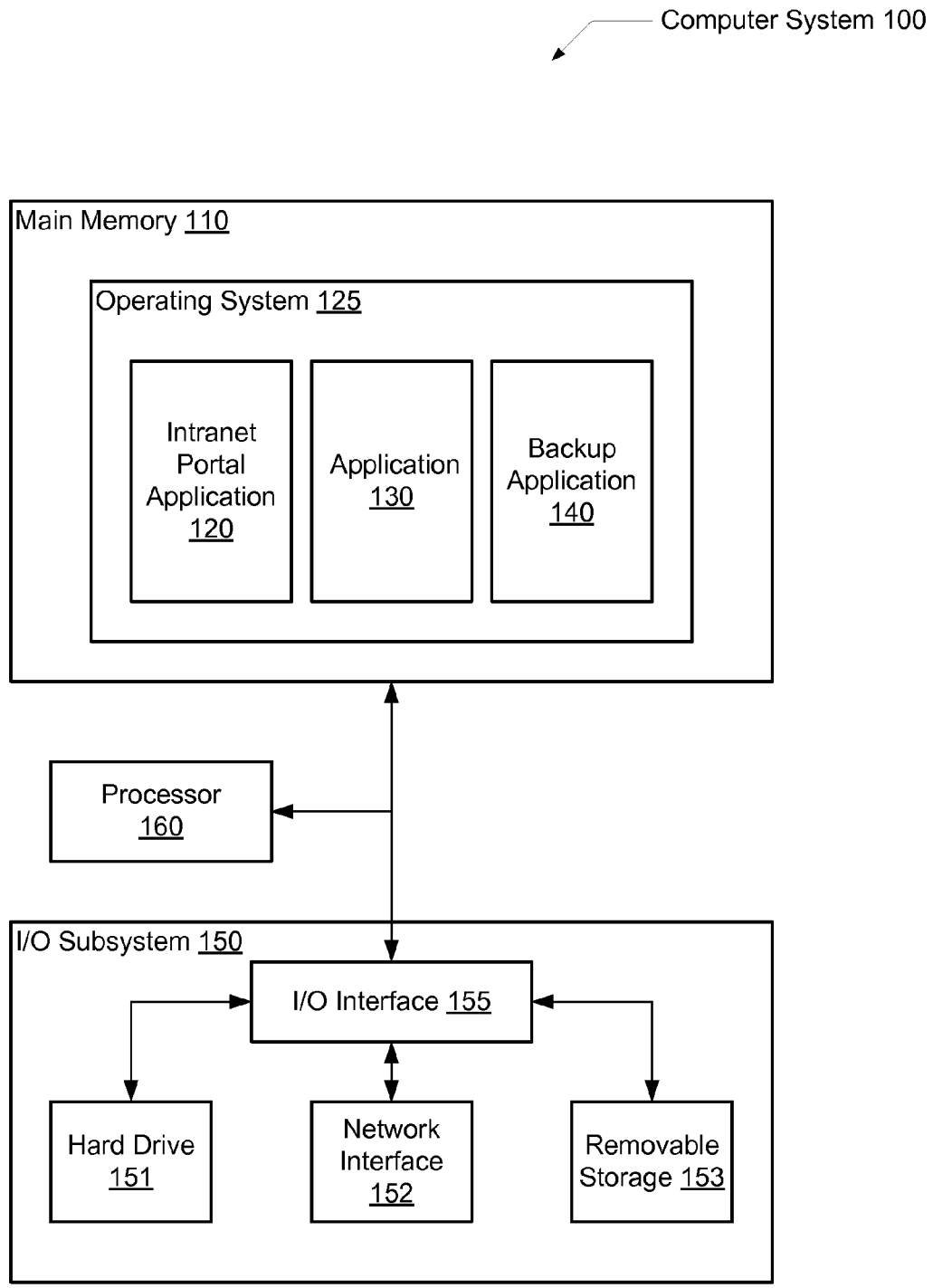
FIG. 1 is a generalized block diagram illustrating one embodiment of a computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring to FIG. 1, a generalized block diagram of one embodiment of a computer system 100 is shown. Computer system 100 includes a processor 160 coupled to a main memory 110. Processor 160 and main memory 110 are in turn connected to an I/O subsystem 150, which comprises an I/O interface 155, a hard disk drive 151, a network interface 152, and a removable storage 153. Computer system 100 may be representative of a laptop, desktop, server, workstation, terminal, personal digital assistant (PDA) or any other type of computer system. In one embodiment, computer system 100 is representative of any number of servers hosting business-critical applications and database servers.

I/O interface 150 is operational to transfer data between processor 160 and/or main memory 120 and one or more internal or external components such as hard disk drive 151, network interface 152 and removable storage 153, as desired. For example, I/O interface 155 may embody a PCI bridge operable to transfer data from processor 160 and/or main memory 120 to one or more PCI devices. I/O interface 155 may additionally or alternatively provide an interface to devices of other types, such as SCSI devices and/or Fibre channel devices.

Hard disk drive 151 may be a non-volatile memory such as a magnetic media. Network interface 155 may be any type of network adapter, such as Ethernet, fiber optic, or coaxial adapters. Removable storage 153 is representative of a disk drive, optical media drive, tape drive, or other type of storage media, as desired.

In addition to the depicted hardware components, computer system 100 may additionally include various software components. For example, FIG. 1 illustrates an operating system 125 stored in main memory 110. Operating system 125 is representative of any of a variety of specific operating systems, such as, for example, Microsoft Windows, Linux, or Sun Solaris. As such, operating system 125 may be operable to provide various services to the end user and provide a software framework operable to support the execution of various programs such as an Intranet Portal application 120, a backup application 140 or any of a variety of other applications represented in the illustrated embodiment by application 130. It is noted that the depicted software components of FIG. 1 may be paged in and out of main memory 120 in a conventional manner from a storage medium such as hard drive 151.

In various embodiments, intranet portal application 120 is operable to manage and maintain a plurality of web pages and electronic documents for a plurality of system users. In one particular implementation, a Microsoft® SharePoint® Server or a similar enterprise information portal program embodies intranet portal application 120.

In one embodiment, intranet portal application 120 comprises web site development software, which supports different types of web sites through the use of a template based architecture. One or more users may provide further changes to a deployed web site definition by adding, deleting, and modifying information stored in corresponding tables and records. Such customizations may provide a preferred look and feel for one or more web pages of the web site that go beyond what is offered or supported by supplied templates. If the web site is lost or removed, at a later time, the web site may be restored. However, customization information may be lost during the restore operation due to the creation process performed by the intranet portal application 120. The backup application 140 may perform steps to prevent the loss of the customization information as further described below.

In the illustrated embodiment, intranet portal 120 may also include an encapsulated version of a database (not shown) for storing lists, items, and records. In one embodiment, intranet portal 120 may be configured to be the 'user' of a database. In one embodiment, a Microsoft® SQL server, a Microsoft® Sharepoint® server, or other database server system embodies a database. It is further noted that one or more client computers may be coupled via a network to computer system 100 allowing the client systems to access the intranet portal 120 centrally via one or more web pages, including access to the database.

A database may represent both a database program and/or one or more actual databases implemented therein (not shown in FIG. 1). The database program refers to the executable commands, user interfaces and other program code for operating the database. The included databases may further comprise various tables, indexes, relationships, queries, stored procedures, file systems, security layers, networking interfaces, etc., which are configured to operate on a plurality of data records, also referred to as records or entries, that constitute the "database."

In one embodiment in which the database is a relational database, the records may be arranged in tables (row and column arrangement). The term "record" as used herein shall refer to an entry in a database. A collection of associated records may be collectively described as a "table" in the database. A record may consist of one or more fields, which may serve as indexes (or keys) to other records in other tables. For example, in a document management database, each record in a document table may represent a document (or data object) stored in the database. In one embodiment, the document (data object) may be stored in the fields of the record itself. In some embodiments, the document (data object) may be represented in a record by a reference to the document, such as a memory location. In addition, the database may create and modify a mounted database file (not shown in FIG. 1) for storing and accessing any given implementation of a relational database. In some embodiments, the database executes on a dedicated computing system, such as computer system 100, that is configured for access by other server and client computers via a communications network.

The database may include various kinds of functions associated with a relational database, such as add, query, and store procedures. The query function may retrieve information from the database, such as newly generated identifier and link values, which is further described later. The add function and store procedures may store information in the database. In one embodiment, interfaces used to provide access to the database may use SQL (Structured Query Language).

Figure 2:
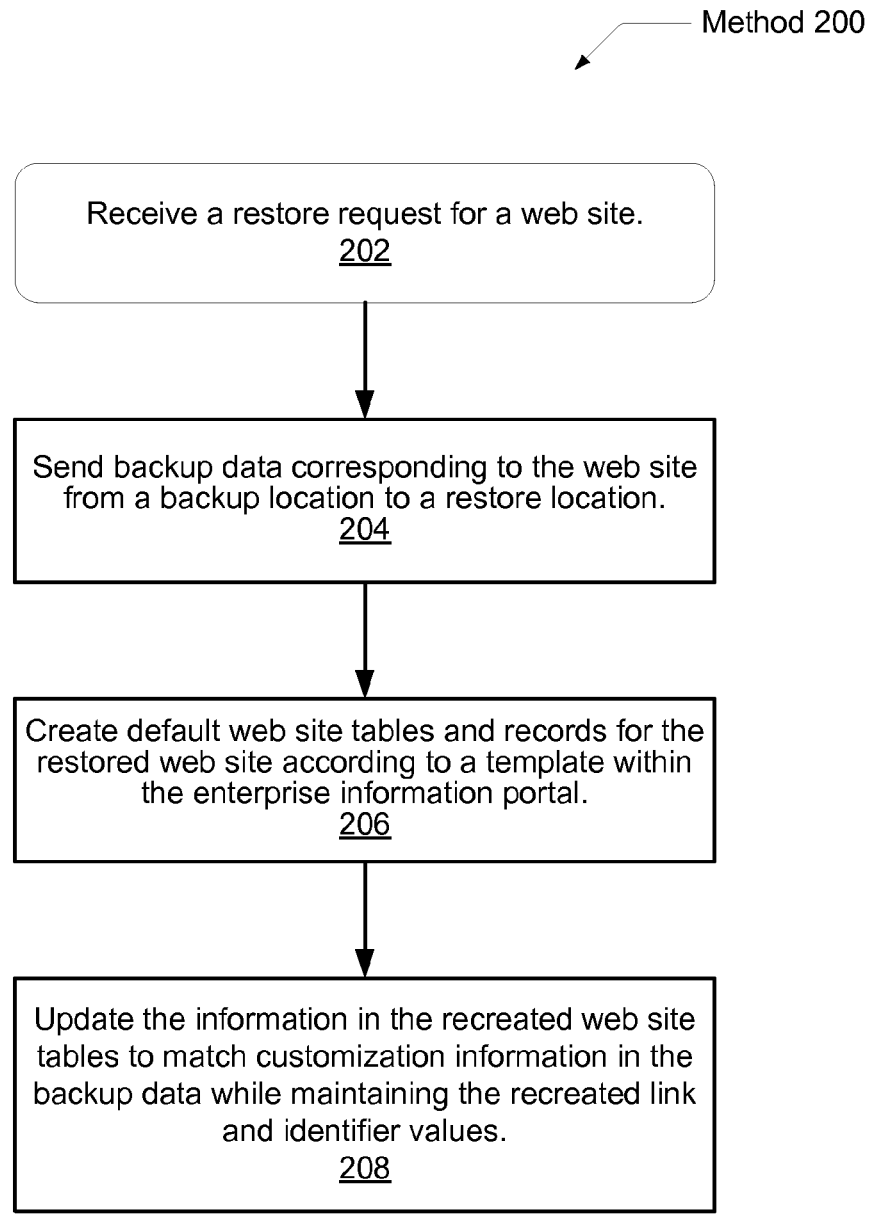
FIG. 2 is a flow diagram illustrating one embodiment of a method for restoring backed up database data and maintaining backed up customization information.

Referring to FIG. 2, an overview of one embodiment of a method 200 for restoring data while maintaining customization information that is stored in a backup copy of the data is shown. For purposes of discussion, the data is described as corresponding to a website. However, the methods and mechanisms described herein are applicable to other, non-website, data as well. The components embodied in the computer system 100 described above may generally operate in accordance with method 200. For purposes of discussion, the steps in this embodiment are shown in sequential order. However, some steps may occur in a different order than shown, some steps may be performed concurrently, some steps may be combined with other steps, and some steps may be absent in another embodiment.

In block 202, a request to restore a user's selected web site may be received by a backup application (e.g., via network interface 152 and I/O interface 155). Identification of a selected web site in a recovered dataset may be performed via a graphical user interface (GUI) on a separate backup server. In addition, the GUI may be used to identify a date and time stamp of the selected web site. Additional status information may be identified corresponding to the request such as a web site name, one or more names of authors, a pathname, a version number, or otherwise. This information may be later used to form a key for querying tables within a database copy on a backup medium.

In response to receiving the web site restore request in block 202, in one embodiment, the request may direct the backup application to being a full restore of a web site. The backup application may simply proceed with a complete restore of the web site irrespective of whether or not any portion of the web site is currently present on the computer system. In some embodiments, a partial restore may be desired. For example, the web site may have partial information still stored on the computer system. In such a case, either the request itself may identify the component(s) to be restored, or a step may be included whereby the intranet portal application may be queried to identify which portions are already present. In such a case, the restore operation may recover only a portion of the web site.

In block 204, the backup application may begin a restore operation by communicating with a backup manager on a separate backup server. This communication may, for example, occur through and I/O interface and network interface. The backup application may communicate with a backup manager to instruct the backup manager to start sending backup data corresponding to the web site to the computer system. In one embodiment, the backup application may restore all the backup data corresponding to the web site prior to communicating with the intranet portal application. In another embodiment, the backup application may begin communicating with the intranet portal application to build the web site as the backup data is being received by the backup application.

In block 206, the intranet portal application may create default tables and records according to a predefined definition or format. This predefined definition may be stored in a predetermined template architecture. The intranet portal application may have predefined templates or themes such as a wiki site, a blog site, a team site, a meeting site, a retail site, and so forth. Such templates may provide a user or users with a well-presented, useful web site, "right out of the box" in an enterprise environment.

Restoring customization information for a web site may not be a straightforward process due to the web site creation process of the intranet portal application. Rather than restore a web site, the intranet portal application may recreate/rebuild a web site. The rebuild process may utilize the template architecture as described earlier and quickly provide a useful web site. However, the template architecture may not include user customizations. For example, in a given template architecture, a particular subsite web page may be defined to comprise three records such as a header record, a main record, and a footer record. The information stored within each of these records may determine a look and feel of the subsite web page. A user may add another section, or zone, to the subsite web page such as a left vertical menu bar. An additional fourth record may describe the additional fourth zone. When the intranet portal application rebuilds the subsite web page, the application may build only the first three records (e.g., header, main, footer) and skip the fourth record. Alternatively, the intranet portal application may rebuild the fourth record, but not link the fourth record to the subsite web page. The first three records are rebuilt and linked to the subsite web page since they are predefined in the template architecture to correspond to the subsite web page. In either case, the rebuilt subsite web page does not include the fourth record. The rebuilt subsite web page will appear different to a user and may be missing information included in the backed up version of the subsite web page. Further, all flags or status information stored in the records may be reset to default values during a rebuild process. Therefore, user customizations within each record may be lost upon a rebuild process.

A broken link between a web page and a record may occur during a rebuild process due to two reasons. The first reason is the use of a template architecture as described above. A second reason is the generation of globally unique identifiers (GUIDs) to reference records and lists of items unambiguously. A pathname, filename, or some other identifier value generated by a user or administrator may inadvertently reference multiple records or lists. In contrast, an automatically generated unique numerical identifier value may be used to reference exactly one record or one list of items. As is well known to those skilled in the art, management of these numerical identifier values may be complicated and therefore responsibility for managing them may be removed from users. As seen above, both a template architecture and the use of GUIDs provide benefits in the development and the management of a large amount of data. However, in the particular case of a rebuild of a database entity, such as a web site, user customizations may be lost due to the effects of a template architecture and GUIDs.

In block 208 of method 200, the backup application may then send data that corresponds to particular tables and records to the intranet portal application. Predetermined store and add functions understood by the intranet portal application may be used. It is noted that step 206 and further step 208 may use a predetermined database protocol in order to connect to a database and perform functions. In one embodiment, an administrator may create custom Structured Query Language (SQL) commands, SharePoint commands, or otherwise, to add and to modify the data source properties of the rebuilt web site. The added data may be used by the intranet portal application to update the particular tables and records and additional data structures according to processes within the intranet portal application. This data may further allow the rebuilt web site to restore all customization information corresponding to user updates that were stored on a backup medium. Referring to the earlier example, a successful link may be created between the subsite web page and the fourth record. In addition, flags and status information within each record may be updated to store the settings and the data in the backed up copies of each record. The additional steps performed and additional information sent to the intranet portal application used to restore user customization are further described shortly.

Figure 3:
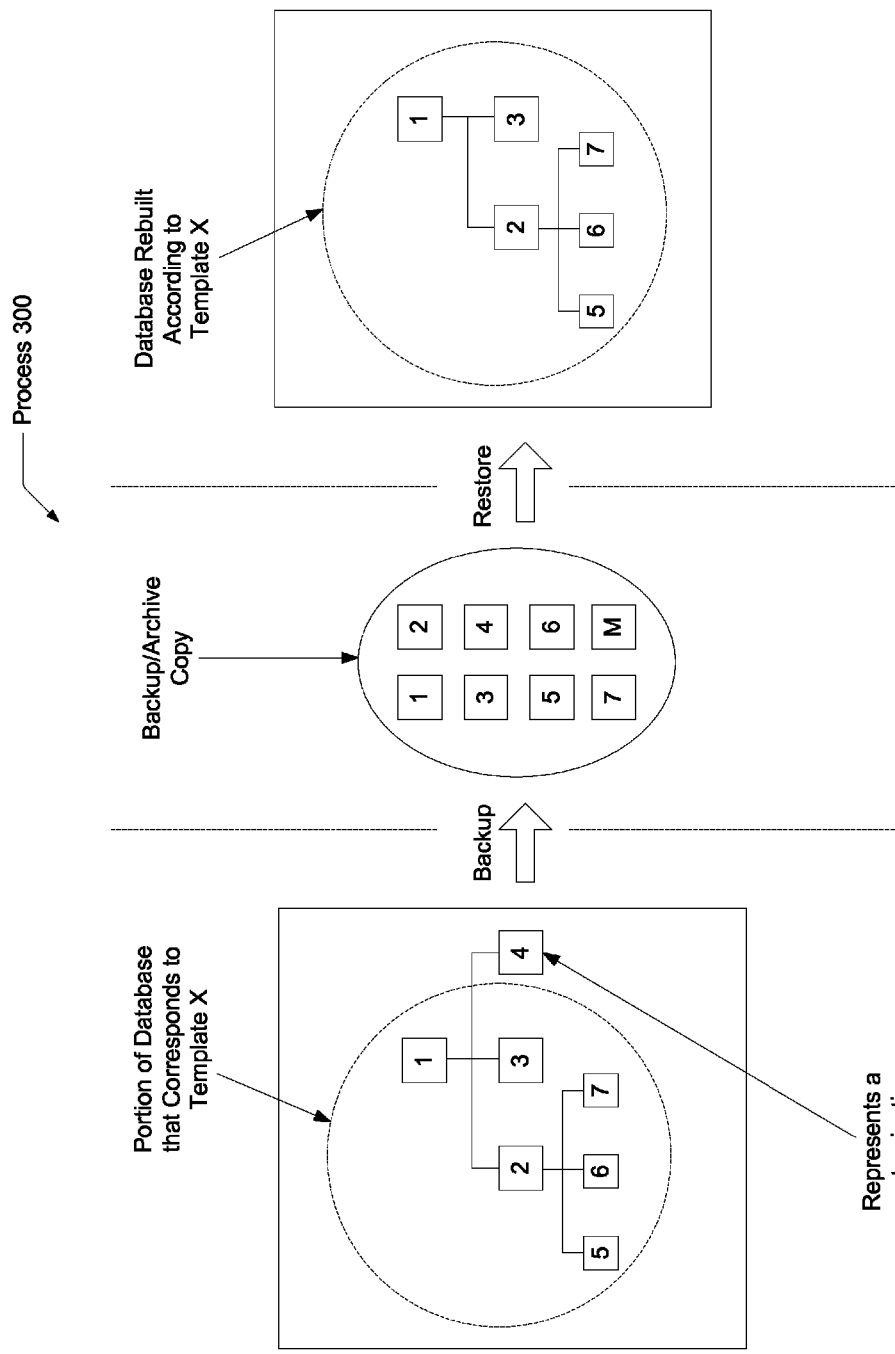
FIG. 3 is a generalized block diagram illustrating one embodiment of a restore process for restoring a database built with a template.

Referring now to FIG. 3, a generalized block diagram illustrating one embodiment of a restore process 300 for restoring a web site built with a template is shown. Again, for purposes of discussion, the data is described as corresponding to a website. However, the methods and mechanisms described herein are applicable to other, non-website, data as well. As can be seen, a template X includes predefined formats corresponding to blocks 1, 2, 3 and 5-7. When a web site is initially built, an intranet portal application may build the hierarchy shown regarding 1, 2, 3 and 5-7. In one embodiment, block 1 may refer to a web page, which is listed in a SharePoint Docs table. Blocks 2 and 3 may refer to corresponding web parts used to describe a view of the web page. Block 5 may be a navigation node that includes a link, or url, to another web page. Blocks 6-7 may refer to lists of items, such as electronic documents, text data, spreadsheets, or otherwise. Block 4 may represent a web part that is added by a user. This addition is a customization that is not defined within the template X.

Continuing with a web site example, block 1 may be defined in a Docs table. Blocks 2-4 may be defined in a Web Parts table. Generated GUID values may be used to link blocks 2-4 with block 1. Block 5 may be defined in a Navigation Nodes table. Blocks 6-7 may be defined in one or more Lists tables. Again, generated GUID values may link blocks 5-7 to block 2.

During a backup operation, the data corresponding to block 1-7 may be stored in a backup copy. Corresponding metadata represented by block M may also be included. During a subsequent restore operation, all of the data may be restored in a first location. However, in order to interpret the raw data, a data structure may be built, such as a web site. During the rebuild process, the predefined format described by template X may be used again. Blocks 1, 2, 3 and 5-7 may be linked together with newly generated GUID values according to the original hierarchy. As can be seen, block 4 is not included in the rebuilt data structure. Alternatively, block 4 may be included, but not linked to the hierarchy. In either case, the rebuilt data structure does not include or have access to block 4. Further, any modifications to a block prior to the backup may not be reflected in the rebuilt data structure. For example, a modification to data corresponding to block 5 may cause block 5 to become block 5.1 (not shown). The backup copy may store block 5.1, rather than block 5. However, the rebuild process that utilizes template X may rebuild block 5.

Continuing with a web page example, the default definition of the web page corresponding to block 1 does not include a third record (block 4). The rebuilt subsite web page may appear different to a user and may be missing information included in the backed up version of the subsite web page. An absent, or unlinked, block 4 represents the missing information, such as a customized left vertical bar. Further, all flags or status information stored in the records may be reset to default values during a rebuild process. Therefore, user customizations within each record may be lost upon a rebuild process.

For example, block 5.1 (not shown) may have a same content as block 5, but block 5.1 has a different view such as different background colors, different fonts, and so forth. These customized appearances are lost and the default values are returned in the rebuilt web page.

Figure 4:
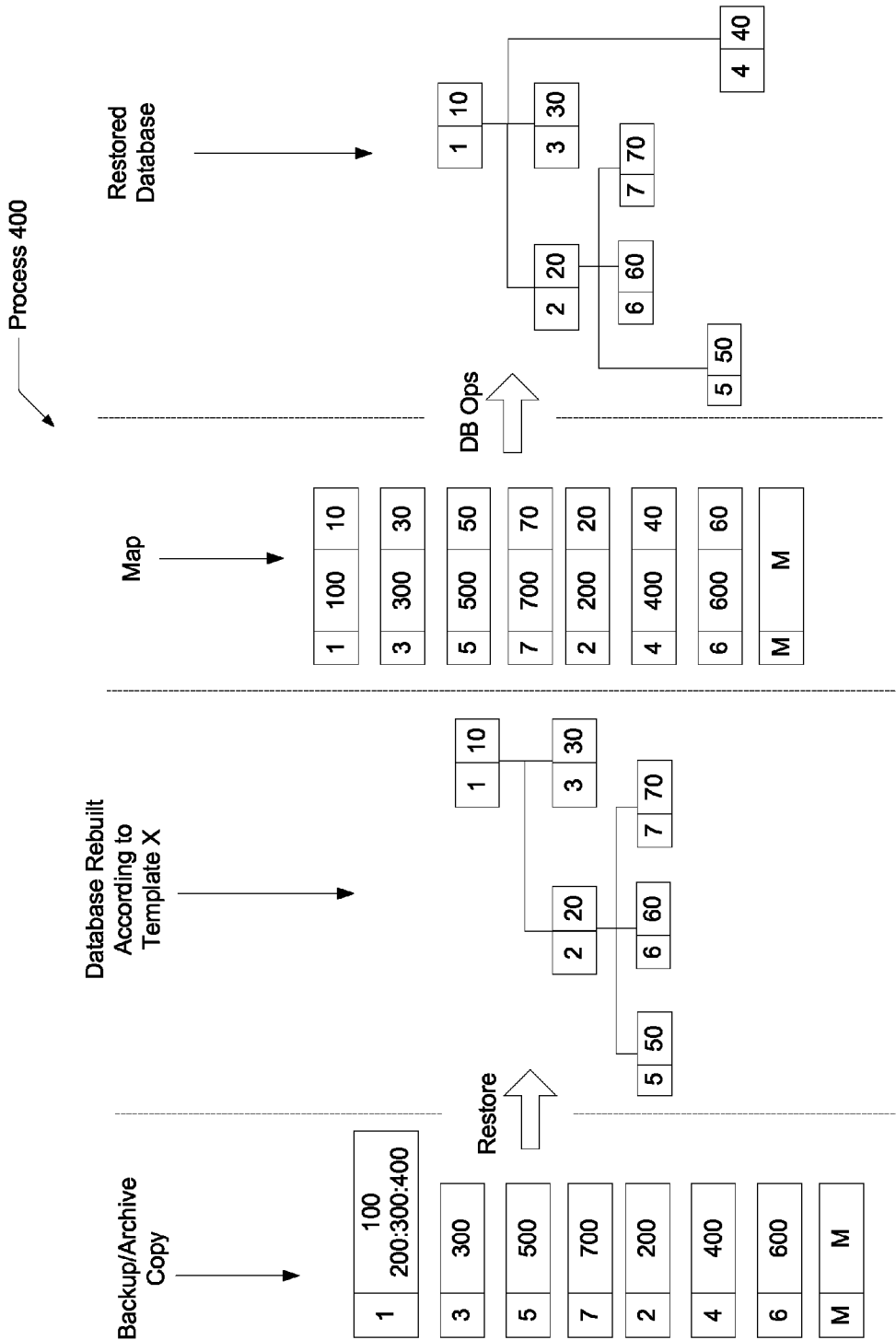
FIG. 4 is a generalized block diagram illustrating one embodiment of a restore process for restoring a database built with a template and maintaining backed up customization information.

Turning now to FIG. 4, a generalized block diagram illustrating one embodiment of a restore process 400 for restoring a web site while maintaining customization information is shown. Similar to process 300, the data represented by blocks 1-7 is described as corresponding to a website. However, the methods and mechanisms described herein are applicable to other, non-website, data as well. A backup copy of blocks 1-7 includes corresponding fields, such as linked-list pointers. A GUID value may be used for each of these pointers. These pointers may be used to index corresponding tables in order to describe a particular data structure. For example, an identifier (ID) with a value of 100 may identify block 1. The identifiers 200, 300 and 400 may identify blocks 2-4 as the children of block 1. For example, ID 200 may correspond to block 2, ID 300 may correspond to block 3 and ID 400 may correspond to block 4. Similarly, blocks 2-7 may include similar fields, which are not shown for ease of illustration.

As previously shown in process 300, after a restore operation, blocks 1-7 may be rebuilt according to a predefined template X. Block 4 is not included in the rebuilt data structure since it is not defined by template X. Alternatively, block 4 is included but block 4 is not successfully linked to the rebuilt data structure. Newly generated IDs are included in the rebuilt structure. As can be seen, block 1 has its backed up ID copy 100 replaced with a newly generated ID 10. Block 2 has its backed up ID copy 200 replaced with newly generated ID 20, and so forth.

In one embodiment, one or more query operations may occur during the rebuilding process for blocks already rebuilt in order to obtain the newly generated ID values. In an alternative embodiment, the one or more query operations may occur after completion of the rebuilding process. A copy of a backed up ID value compared to a corresponding newly generated value provides a mapping between the ID values.

In order to obtain a newly generated ID for block 4, an overwrite operation may occur for block 1. For example, the backed up copy of block 1 includes 3 fields with the pointer ID values 200, 300 and 400. However, the rebuilt copy of block 1 may include 2 fields with the pointer ID values 20 and 30. With database operations, or custom commands as described earlier, the data corresponding to the backed up copy of block 1 may be used to overwrite the data corresponding to the rebuilt copy of block 1. The custom command may prevent regeneration of existing ID values, such as pointer ID values 20 and 30. However, an additional pointer value, such as 400 may be replaced with a newly generated ID value 40. A subsequent query command may provide the value 40 of the newly generated ID. A mapping for block 4 may be completed. Now, another custom database command may be executed to add the data corresponding to block 4 to the rebuilt data structure. As shown, the restored data structure now has a hierarchy of the backed up copy of the data structure, although new IDs are used and a template definition was used.

Figure 5:
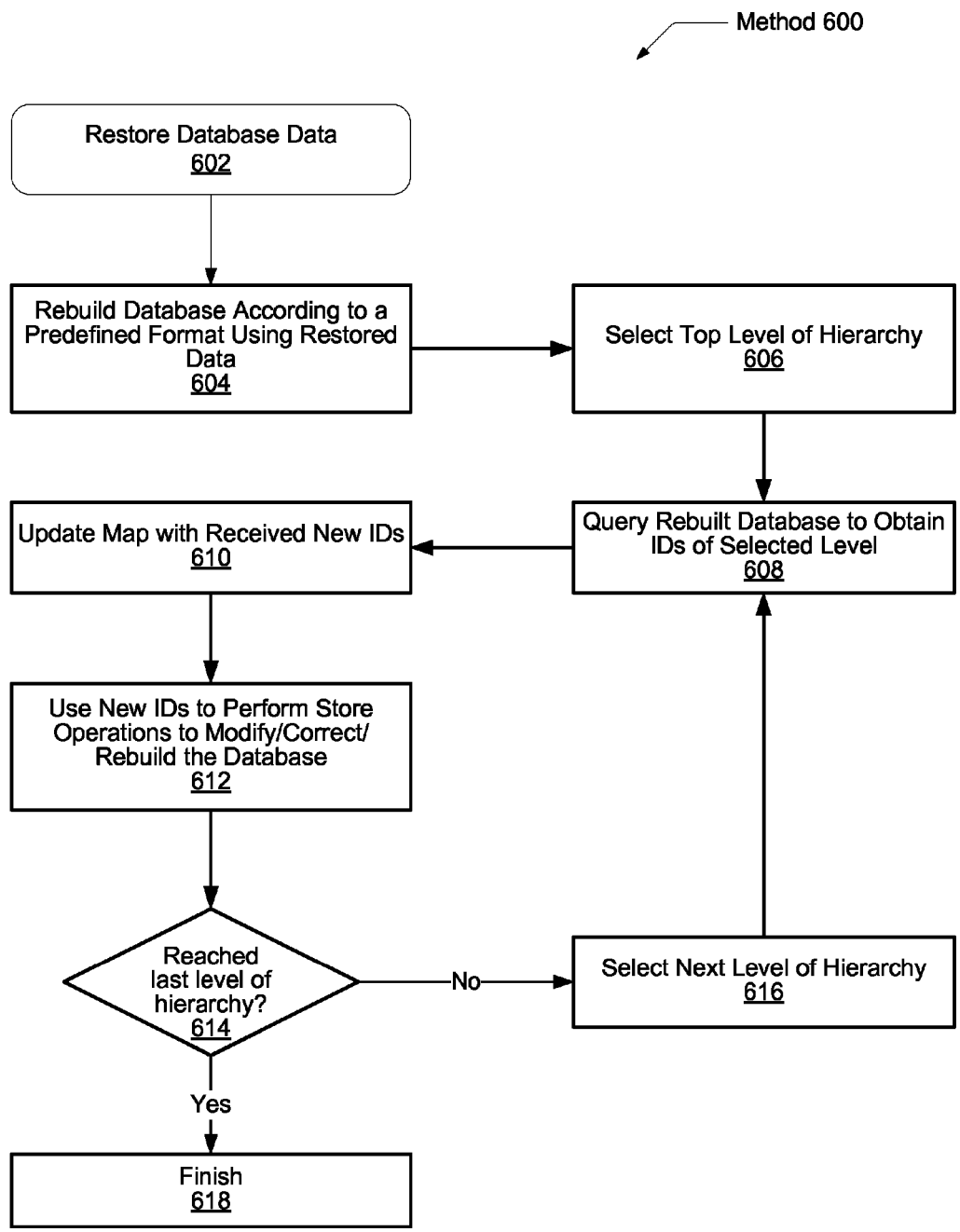
FIG. 5 is a flow diagram illustrating another embodiment of a method for restoring backed up database data and maintaining backed up customization information.

Referring now to FIG. 5, an embodiment of a method 600 for restoring a web site or other data while maintaining customization information in a backup copy is shown. The components embodied in the computer system 100 described above may generally operate in accordance with method 600. For purposes of discussion, the steps in this embodiment are shown in sequential order. However, some steps may occur in a different order than shown, some steps may be performed concurrently, some steps may be combined with other steps, and some steps may be absent in another embodiment.

In block 602, data corresponding to a database copy on a backup medium may be restored. In one embodiment, the backed up data corresponds to a full web site. A backup agent on an applications server may receive a restore request. As is well known to those skilled in the art, the backup agent performs functions to completely restore data corresponding to the web site on the applications server. The restored data includes any customization information that may not conform to a given template architecture.

In block 604, the restored data may be used to rebuild the database according to a predefined format. In one embodiment, an intranet portal application may create default tables and records according to a predetermined format (e.g., a template architecture). In another embodiment, the template architecture may be stored with the backup data to be restored. When the template is restored, the template may be sent to the intranet portal application for the web site rebuild process. The intranet portal application may generate new GUIDs for linked list pointer values used to describe the hierarchy. In one embodiment, the rebuilt database data structure corresponds to a web site. The hierarchy may describe the lists and navigation nodes within web parts and which web parts correspond to which web pages. In block 606, the top level of the hierarchy may be selected for a routine to be described shortly. In the example shown in process 400, the top level is block 1. Alternatively, the bottom level may be selected or another level. The selection of the top level may lead to a top-down approach for the routine or method described below. A selection of the bottom level of the hierarchy may lead to a bottom-up approach.

In block 608, a query command may be sent to the intranet portal application to obtain one or more identifier values (IDs) corresponding to the selected level of the hierarchy. In the example shown in process 400, a query operation is used to obtain the newly generated ID values 10, 20 and 30. In one embodiment, block 1 may correspond to an entry in a Docs table. The Docs table may store metadata about documents. In one embodiment, the Docs table may comprise metadata corresponding to files with an "aspx" file extension. Each entry in the Docs table may refer to a web page within the corresponding web site to be restored. One or more web parts may correspond to each web page and are further described in the Web Parts table. The Docs table may store all the documents of all web page sites corresponding to the web site represented by the database. These documents may include, for example, documents in document libraries, attachments, and nodes for each list. At least a generated GUID may be used to link a file stored in the Docs table to one or more corresponding web parts in the Web Parts table.

The ID 10 may correspond to a Docs ID of a web page described by the entry in the Docs table. The IDs 20 and 30 may correspond to web parts described in a separate Web Parts table. The query command may use a unique identifier to identify one or more blocks of the selected hierarchy. In the above example, a unique filename for an entry in the Docs table corresponding to a web page within a web site may be used.

In block 610, the received new ID values corresponding to the query command(s) may be used to update a mapping of IDs. For example, a mapping between backed up IDs and newly generated IDs may be maintained. Referring again to the above example as shown with process 400 in FIG. 4, the backed up IDs 100, 200 and 300 are updated with their corresponding newly generated values 10, 20 and 30. In one embodiment, a backup agent maintains this mapping. In one embodiment, a backup agent stores this mapping in a cache. In a further embodiment, the backup agent maintains a copy of the restored Web Parts table and the restored Navigation Nodes table. A mapping of the GUIDs may be maintained in these cached copies or in another storage location.

In block 612, the new received ID values may be used to update the rebuilt data structure. For example, the top level of the hierarchy may be overwritten with a stored copy of a backup version of the data complete with the new ID replacing the old ID. In the example shown in process 400, the top level is block 1. The rebuilt version of block 1 includes fields storing ID values 10, 20 and 30. This rebuilt version may be overwritten with a backed up version that also includes fields storing ID values 10, 20 and 30. Previously these fields stored ID values 100, 200 and 300 prior to a remapping step. The backup version also includes another field storing an ID value 400 for block 4. In one embodiment, the rebuilt version may be first erased and then rewritten. In another embodiment, a prior comparison may be performed to detect any differences between the rebuilt version of block 1 and the backed up version of block 1. If no differences are detected, then no further action toward block 1 may occur. If there are detected differences, then an overwrite operation or an update operation may be performed on the rebuilt version of block 1. In one embodiment, the entire record or all of the data corresponding to block 1 is overwritten.

In another embodiment, only fields with detected differences are overwritten or added. In the example shown in FIG. 4, the backed up copy has an additional child block, block 4. This additional block may be detected and he rebuilt version may be updated to include the additional child block 4. In doing so, a new ID value for block 4 may be generated, such as ID 40. A subsequent query command may provide this newly generated ID to be used to update a mapping of the ID values. It would be known that the backed up ID value 400 corresponds to the newly generated ID value 40.

In the example for a web site restore, the backup agent may use functions corresponding to the intranet portal application's interface to populate a top-level hierarchy table, such as the Docs table, in the web site data structures. The data used to populate the table may be top-level hierarchy table information in the backup copy, such as the aspx files corresponding to each web page within the web site. This population process may overwrite the default information already stored in the application's Docs table.

If the last level of the hierarchy has been reached (conditional block 614), then in block 616, the next level of the hierarchy may be selected. For example, a next lower level of the hierarchy below the top level may be selected. Alternatively, if a bottom-up approach is used, then the next higher level of hierarchy may be selected. Then method 600 may return to block 608. Referring again to the example shown in FIG. 4, for a top-down approach, the second level including blocks 2, 3 and 4 may be selected.

Continuing with the example shown in FIG. 4, in block 608, query commands including a unique identifier for blocks 2, 3 and 4 may be used to obtain one or more identifier values (IDs) corresponding to the selected level of the hierarchy. In the example shown in process 400, the obtained newly generated ID values may include the values 50, 60 and 70. In one embodiment, blocks 2, 3 and 4 may correspond to records within a Web Parts table for a web site. The ID 50 may correspond to an ID of a navigation node described by a record in a Navigation Nodes table. The IDs 60 and 70 may correspond to lists of items described in a separate Lists table. The query command may use a unique identifier to identify blocks 2, 3 and 4 of the selected hierarchy. For example, the IDs 10 and 20 may correspond to a Docs ID and a Web Parts ID that may match fields only for block 2 in a Web Parts table. At a later time, when the next level of the hierarchy is selected, a url may be used as a unique identifier for blocks 5, 6 and 7. The url values may correspond to a destination url for a navigation node and url values corresponding to storage locations for lists of items.

Alternatively, in block 616, after a top level of the hierarchy has been chosen, rather than choose a next consecutive level of hierarchy, the bottom level of hierarchy may be chosen. In yet another embodiment, the bottom level of the hierarchy may be simultaneously chosen with the top level of the hierarchy. Referring to the example shown in FIG. 4, this bottom level of the hierarchy may include blocks 5, 6 and 7. Unique identifiers, such as url values, may already be known for these blocks by being stored in a backed up version of the blocks. Then the steps 608-612 which include querying, obtaining newly generated IDs, and updating a mapping of IDs may be performed simultaneously with the same steps performed on the top level of the hierarchy (e.g., block 1). At the completion of the steps for both the top level and the bottom level of the hierarchy, the middle hierarchy may have its mapping updated without any further queries.

Continuing with the above example, in one embodiment, the top level of the hierarchy may correspond to a Docs table and the bottom level may correspond to both a Navigation Nodes table and a Lists table. The middle level may correspond to a Web Parts table. In this web site example, there are only three levels of hierarchy, but other numbers of levels are possible and contemplated. Mapping entries corresponding to the Lists table may be updated simultaneously with an update of the Docs table. Afterward, a cached copy of the Web Parts table may be updated entirely with no further query commands sent to the intranet portal application. Subsequently, the cached updated Web Parts table may overwrite the rebuilt Web Parts table through the use of database commands as described above. Alternatively, a comparison may be performed between the cached Web Parts table and the rebuilt Web Parts table and only detected differences may yield database commands to store the updated information in the rebuilt Web Parts table. Afterward, a cached copy of the Navigation Nodes table may be updated with the remapping values found in the cached copy of the Web Parts table and with no further queries for the intranet portal application.

An update of the Navigation Nodes table may be handled similarly as the Web Parts table. A comparison to detect differences may or may not be used. Other combinations of selecting and updating are possible and contemplated, but each implementation results in a rebuilt version of a data segment to store the same values as a corresponding backed up version of the data segment. An entry, or record, in the Navigation Nodes table may point to a destination (e.g., web page) outside of the intranet portal application, such as www-.yahoo.com, www.google.com, and so forth. These web pages are not defined within the private intranet portal application. Otherwise, the record within the Navigation Nodes table may point to a web page defined within the intranet portal application. This web page may have an entry within the Docs table supported by the intranet portal application and have a corresponding Docs GUID.

In one embodiment, if a currently selected entry of the Navigation Nodes table points to a destination web page supported by the intranet portal application, then the backup agent may index the cached Web Parts table with a backed up value of a Web Parts GUID and a Docs GUID stored in the Navigation Nodes table. The Web Parts GUID may correspond to a web part described by an entry within the cached Web Parts table. The Docs GUID may correspond to a destination document described by an entry in the Docs table. The combination of the two GUID values may narrow down a match to one entry within the cached Web Parts table. Otherwise, a single value may hit on several records within the Web Parts table as many entries may share the executable code of a particular web part and several entries may have a same entry in the Docs table as a destination for a navigation node.

The above step would be analogous to knowing block 5 shown in FIG. 4 stores values in corresponding fields that hold the ID 100 and the ID 200. The field storing ID 100 may indicate that block 5 points to ID 100 (e.g., block 1) as a destination. The field storing ID 200 may indicate block 5 is referenced by block 2. By indexing the level of hierarchy corresponding to blocks 2, 3, and 4 with the ID values 100 and 200, a match on block 2 may yield the remapped values 10 and 20. The corresponding fields in block 5 may be updated with these remapped values. Indexing the level of hierarchy corresponding to blocks 2, 3 and 4 may be analogous to indexing a Web Parts table that stores records corresponding to blocks 2, 3 and 4.

If the current selected entry of the Navigation Nodes table does not point to a destination web page supported by the intranet portal application, then the backup agent may index the cached Web Parts table with a backed up value of a Web Parts GUID and a url value of a web page outside of the supported web site. Again, the Web Parts GUID may correspond to a web part described by an entry within the cached Web Parts table. The url value may correspond to a web page supported outside of the intranet portal application. The combination of the GUID value and the url value may narrow down a match to one entry within the cached Web Parts table. As described above, a hit within the cached Web Parts table produces a stored new GUID value for the Web Parts GUID. This new value is a newly generated value, which may have been stored earlier in the cache. These values may be stored in the selected entry in the Navigation Nodes table.

If the last level of the hierarchy has been reached in method 600 (conditional block 614), then no further updates are performed. All blocks, such as blocks 1-7 shown in FIG. 4, store the same information as a corresponding backed up version except for the newly generated IDs. However, the rebuilt version has a same hierarchy as the backed up version as shown in FIG. 4. In the example of restoring a web site, the updates cause the rebuilt web site to maintain the customizations included in the backed up version of the web site.

Figure 6:
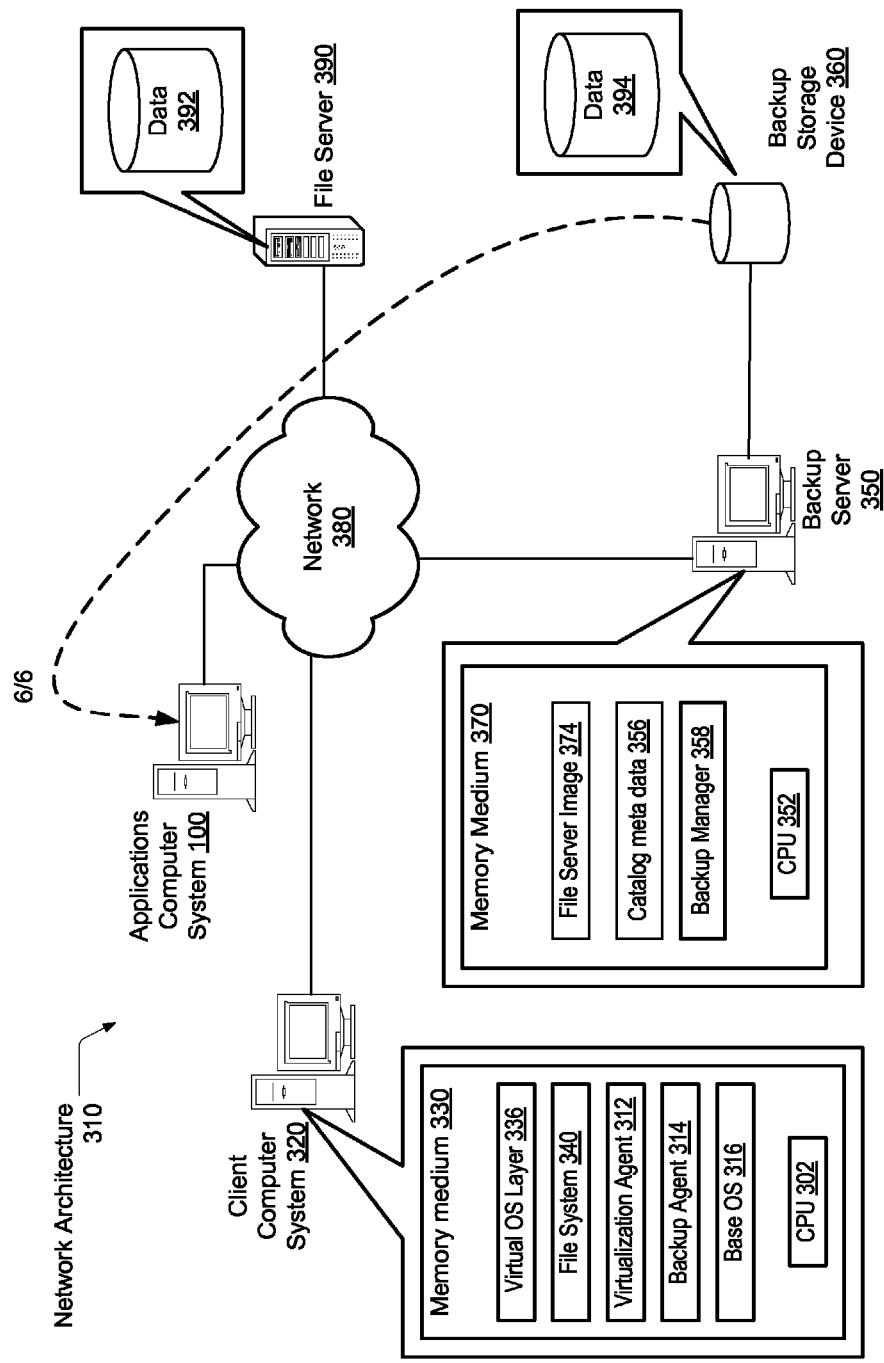
FIG. 6 is a generalized block diagram illustrating one embodiment of a network architecture.

Turning now to FIG. 6, one embodiment of a network architecture 310 is shown. Network architecture 310 includes applications computer system 100 and client computer system 320 interconnected through a network 380 to one another, to a file server 390, and to a backup server 350. Computer system 100 may generally corresponds to system 100 of FIG. 1, though not necessarily so. Disk storage 360 is coupled to backup server 350. Network 380 may include a variety of techniques including wireless connection, direct local area network (LAN) connections, wide area network (WAN) connections such as the Internet, a router, and others. Network 380 may comprise one or more LANs that may also be wireless. Network 380 may further include remote direct memory access (RDMA) hardware and/or software, transmission control protocol/internet protocol (TCP/IP) hardware and/or software, router, repeaters, switches, grids, and/or others.

In various embodiments of network architecture 310, applications computer system 100 is representative of any number of servers hosting business-critical applications and database servers. In addition, applications computer system 100 may include one or more of the system components described both above and further described below for client 320.

Client computer system 320 is representative of any number of stationary or mobile computers such as servers, desktop PCs, laptops, handheld computers, etc. Client 320 may include at least a single processor 302 and a memory medium 330. Client 320 may use processor 302 to execute instructions of software applications. Client 320 may contain one or more software applications on its memory medium 330. For example, client 320 may include a backup agent 314. Similarly, client 320 may include a virtualization agent 312 for use in creating and maintaining virtual environments in the client.

In some embodiments, the systems 100 and 320 may include an operating environment, e.g. an operating system, such as base OS 316 and/or a virtual OS layer 336. In various embodiments, the provided base OS 316 may be any of various operating systems, including MS-DOS®, MS-WINDOWS®, OS/20, UNIX®, Linux®, Solaris® or another known operating system. In some embodiments, the systems 100 and 320 have only a virtual OS layer 336 provided by an IT administrator using a common image of the layer. In other embodiments, the systems 100 and 320 have both a base OS 316 and a virtual OS layer 336. The operating system may interface between the system hardware and the software applications.

Continuing with the components of the systems 100 and 320, a file system 340 may be included. Similar to a file system on the file server 390, the backup server 350, or any other computer system or server, file system 340 may operate as a special-purpose database for the storage, organization, manipulation, and retrieval of data. A user may browse the directories stored on a corresponding data storage medium via the file system 340.

The file server 390 in network architecture 310 may be any kind of server configured to store data. In one embodiment, file server 390 may be a Network-Attached Storage (NAS) device. The file server 390 may be a computer specialized for providing file storage services to computer systems 100 and 320 and other information servers (not shown). The operating system and other software on the file server 390 provide the functionality of file systems, the access to files, and the management of these functionalities. The file server 390 may include one or more hard disks, often arranged into logical, redundant storage containers or RAID arrays (redundant arrays of inexpensive/independent disks). The data 392 may be stored on one or more of the hard disks of the file server 390.

The file server 390 may provide data storage at the file system level. The file server 390 may use file-based protocols such as Network File System (NFS) (popular on UNIX systems), SMB/CIFS (Server Message Block/Common Internet File System) (used with MS Windows systems), or AFP (used with Apple Macintosh Computers). In the example of FIG. 3, files on the file server 390 may be accessed through a Network File System (NFS) interface included in network 380.

Turning now to the backup storage device 360, device 360 may be used to store backup copies of data within the network architecture 310. Backup data 394 may store copies of data 392, copies of data included in computer systems 100 and 320, and copies of data included in other information servers (not shown). Backup storage device 360 may include or be further coupled to several varieties of storage consisting of one or more hard disks, tape drives, server blades, or specialized devices, and may include a variety of memory devices such as RAM, Flash RAM, MEMS (Micro Electro Mechanical Systems) storage, battery-backed RAM, and/or non-volatile RAM (NVRAM), etc.

In one embodiment, the backup server 350 in network architecture 310 may include a backup application 358. This backup application 358, or "backup manager" may comprise program instructions stored on the memory medium 370 and executable by the processor 352 to perform one or more backup operations. Backup operations may include creating partial or full backups, e.g., on a computer system or from one computer system to another system; performing restore functions (e.g., partial or granular restore functions, or full restore functions) on a computer system or from one computer system to another computer system; backup operations may also include other operations.

The backup manager 358 on backup server 350 may be configured to create various types of backups of data 392. For example, image based, file based, or other types of backups may be created. In some embodiments, the backup manager 358 may receive user input directing the backup manager 358 to create a backup of a specific system, such as file server 390. In some embodiments, the backup manager 358 may create a backup of a specific system automatically, e.g., the backup manager may be scheduled to perform regular backups of a specific system. The backup manager 358 may create and store the backup, or the file server image 374, in a commonly known file format, such as the Virtual Hard Disk (VHD) format, the V2I format, and the Virtual Machine Disk Format (VMDK) format.

Continuing with a description of a data backup operation, in one embodiment, the backup manager 358 on backup server 350 may create the backup of data 392, such as file server image 374, and store it on the backup storage device 360. In another embodiment, the backup manager 358 may store the backup on the backup server 350, e.g., on a memory medium 370 of the backup server 350, as shown. In yet other embodiments, the backup manager 358 may instead store the backup on another device, e.g., on another computer system (such as another server) connected over the network 380. In any of the embodiments, a backup copy of a backup may be subsequently restored to the file server 390 (or to another computer or server system) in the event that it becomes necessary to do so. Recovery of a backup copy may have a variety of uses. For example, it may be used during system deployment for the setup of many computers. Another use may include data recovery. The backup may allow restoration of a system after data loss caused by an operating system crash, a virus attack, hardware failure, or otherwise.

In one embodiment, the backup manager 358 may create a backup of computer systems 100 and 320 directly without using file server 390. Such a backup may be performed to protect data on computer systems 100 and 320, which may not yet be updated on file server 390. In embodiment, the backup manager 358 may perform file-by-file backups of data stored on computer systems 100 and 320. Computer systems 100 and 320 may have been offline for a period of time while data was updated on the memory medium 330. Alternatively, the users may not yet have manually updated files from memory medium 330 to file server 390 even while online Again, the backup manager 358 may receive user input directing the backup manager 358 to create file-by-file backups of computer systems 100 and 320. In some embodiments, the backup manager 358 may automatically create file-by-file backups of computer systems 100 and 320 if they are connected to network 380. In this case, a scheduled regular backup may be implemented, such as a daily or weekly scheduled backup of computer systems 100 and 320. A database backup for applications computer system 100 may be performed that stores a copy of a web site on backup storage device 30. The web site information may include tables, records, lists of items, corresponding GUIDs, and so forth that are used to present a view of web pages within the site to a user.

A backup agent on system 100 may generate a schema of table and index information along with the backed up contents of a database and store the generated schema to backup storage device 360. As used herein, "schema" refers to the data structure of a database file. In one embodiment, a database copy is a binary file that is sequentially accessed, using standard file I/O calls to the file system of the storage medium on which the binary file is stored. It is further noted that database copy may be structured in block units of memory, also referred to as pages or allocation units. The schema may then be used to access or restore the contents of database copy, without using the database.

As part of creating a backup, such as a file-by-file backup of computer systems 100 and 320, the backup manager 358 may also create catalog metadata 356 associated with the corresponding files, or data objects. The catalog metadata 356 created by the backup manager 358 during a backup operation, such as a backup of data on client 320, may include metadata for the files. Metadata may include at least one or more of the following: a data name, data size, a fingerprint of the data, a batch number, as well as data type, version number, ownership, permissions, modification time, error code, etc. A batch number may be used to identify the particular backup operation in which an associated backup entry was created. Other forms of metadata and/or identifiers will be apparent to those of ordinary skill in the art. The catalog metadata 356 may be usable for restore browsing, e.g., at a later time.

Referring again to systems 100 and 320, in addition to including software applications on a corresponding memory medium, the systems may also contain backup system agent software. Generally speaking, an agent is a software routine that may wait for a detection of a predetermined event and perform one or more actions when such detection occurs. A backup system agent, or backup agent, may be software configured to assist the backup manager 358 on the backup server 350 to perform one or more backup and restore functions. In some embodiments the backup system agent may also be configured to perform one or more backup functions independently of a backup manager 358. For example, a backup agent on applications computer system 100 may perform independent functions during a restore of a web site. These independent functions may allow a web site to be restored complete with customizations. Typically, customizations may be lost due to broken links caused by newly generated GUIDs during the creation process by the intranet portal application 120.

It is noted in alternative embodiments, the number and type of clients, servers, and storage devices is not limited to those shown in FIG. 3. Almost any number and combination of servers, desktops, laptops, and mobile clients may be interconnected in network architecture 310 via various combinations of modem banks, direct LAN connections, wireless connections, WAN links, etc. Also, at various times one or more clients may operate offline. In addition, during operation, individual client connection types may change as mobile users travel from place to place connecting, disconnecting, and reconnecting to network architecture 310.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for restoring a database from a backup copy of the database storing data in a plurality of blocks, wherein the backup copy of the database includes identifiers which describe a relationship between the blocks, the method comprising:

initiating restoration of the database from the backup copy of the database, the database having been customized prior to the database having been backed up;

rebuilding the database from the backup copy of the database according to a template, wherein rebuilding the database according to the template results in a rebuilt database which does not reflect customizations made to the database prior to the backup, and wherein said rebuilding comprises generating new globally unique identifiers (GUID) in the rebuilt database for corresponding old GUIDs stored in the backup copy of the database, wherein a database comprises a plurality of GUIDs, each of which represents a globally unique identifier used to reference records and lists of items within the database;

identifying differences between the database represented by the backup copy of the database and the rebuilt database; and modifying the rebuilt database to reflect said differences so that the rebuilt database is equivalent to the backup copy of the database, wherein said modifying comprises:

selecting a given level of a hierarchy of the rebuilt database;

querying the rebuilt database to obtain at least one new GUID corresponding to the given level;

updating a mapping of new GUIDs in the rebuilt database to old GUIDs in the backup copy of the database; and using the at least one new GUID and said mapping to modify the rebuilt database to reflect said customizations.

2. The method as recited in claim 1, further comprising creating a map of old IDs stored in the backup copy of the database to newly generated IDs stored in the rebuilt database.

3. The method as recited in claim 2, wherein identifying said differences comprises:

analyzing relationships between blocks in the backup copy of the database;

analyzing relationships between blocks in the rebuilt database; and identifying new and/or missing relationships between blocks.

4. The method as recited in claim 3, wherein said modifying comprises utilizing a protocol for an intranet portal application for querying, adding, and replacing elements of the rebuilt database, wherein the intranet portal application rebuilds and maintains a hierarchy of the database.

5. The method as recited in claim 4, further comprising including one or more unique block identifiers in a query command for one or more new IDs stored in a selected level of the hierarchy.

6. The method as recited in claim 4, wherein the hierarchy of the database corresponds to a web site.

7. The method as recited in claim 6, wherein levels of the hierarchy correspond to tables describing the web site and the blocks correspond to records stored in the tables.

8. A computer system comprising:
a processor; and
a storage device storing a backup copy of a database storing data in a plurality of blocks, wherein the backup copy of the database includes identifiers which describe a relationship between the blocks;
wherein the processor is configured to:
initiate restoration of a database from the backup copy of the database, the database having been customized prior to the database having been backed up;
rebuild the database from the backup copy of the database according to a template, wherein rebuilding the database according to the template results in a rebuilt database which does not reflect customizations made to the database prior to the backup, and wherein said rebuilding comprises generating new globally unique identifiers (GUID) in the rebuilt database for corresponding old GUIDs stored in the backup copy of the database, wherein a database comprises a plurality of GUIDs, each of which represents a globally unique identifier used to reference records and lists of items within the database;
identify differences between the database represented by the backup copy of the database and the rebuilt database; and
modify the rebuilt database to reflect said differences so that the rebuilt database is equivalent to the backup copy of the database, wherein to modify the database the processor is configured to:
select a given level of a hierarchy of the rebuilt database;
query the rebuilt database to obtain at least one new GUID corresponding to the given level;
update a mapping of new GUIDs in the rebuilt database to old GUIDs in the backup copy of the database; and
use the at least one new GUID and said mapping to modify the rebuilt database to reflect said customizations.

9. The computer system of claim 8, wherein in identifying said differences the processor is configured to:
analyze relationships between blocks in the backup copy of the database;
analyze relationships between blocks in the rebuilt database; and
identify new and/or missing relationships between blocks.

10. The computer system of claim 9, wherein in modifying the rebuilt database the processor is configured to utilize a protocol for an intranet portal application for querying, adding, and replacing elements of the rebuilt database, wherein the intranet portal application rebuilds and maintains a hierarchy of the database.

11. The computer system of claim 10, wherein the processor is further configured to include one or more unique block identifiers in a query command for one or more new IDs stored in a selected level of the hierarchy.

12. The computer system of claim 10, wherein the program instructions are further executable to include one or more unique block identifiers in a query command for one or more new IDs stored in the selected level of the hierarchy.

13. The computer system of claim 10, wherein the hierarchy of the database corresponds to a web site.

14. The computer system of claim 13, wherein levels of the hierarchy correspond to tables describing the web site and the blocks correspond to records stored in the tables.

15. A non-transitory computer-readable storage medium storing program instructions for restoring a database from a backup copy of the database storing data in a plurality of blocks, wherein the backup copy of the database includes identifiers which describe a relationship between the blocks, wherein the program instructions are executable by the processor to:
initiate restoration of a database from the backup copy of the database, the database having been customized prior to the database having been backed up;
rebuild the database from the backup copy of the database according to a template, wherein rebuilding the database according to the template results in a rebuilt database which does not reflect customizations made to the database prior to the backup, and wherein said rebuilding comprises generating new globally unique identifiers (GUID) in the rebuilt database for corresponding old GUIDs stored in the backup copy of the database, wherein a database comprises a plurality of GUIDs, each of which represents a globally unique identifier used to reference records and lists of items within the database;
identify differences between the database represented by the backup copy of the database and the rebuilt database; and
modify the rebuilt database to reflect said differences so that the rebuilt database is equivalent to the backup copy of the database, wherein to modify the database the program instructions are executable to:
select a given level of a hierarchy of the rebuilt database;
query the rebuilt database to obtain at least one new GUID corresponding to the given level;
update a mapping of new GUIDs in the rebuilt database to old GUIDs in the backup copy of the database; and
use the at least one new GUID and said mapping to modify the rebuilt database to reflect said customizations.

16. The non-transitory computer-readable storage medium of claim 15, wherein in identifying said differences the program instructions are executable to:
analyze relationships between blocks in the backup copy of the database;
analyze relationships between blocks in the rebuilt database; and
identify new and/or missing relationships between blocks.

17. The non-transitory computer-readable storage medium of claim 16, wherein the program instructions are further executable to utilize a protocol for an intranet portal application for querying, adding, and replacing elements of the rebuilt database, wherein the intranet portal application rebuilds and maintains a hierarchy of the database.

* * * * *